United States Patent
Ikeda et al.

(10) Patent No.: US 7,049,939 B2
(45) Date of Patent: May 23, 2006

(54) POWER LINE CARRIER SYSTEM

(75) Inventors: Hiroshi Ikeda, Kyoto (JP); Yukihiro Fukumoto, Osaka (JP); Satoshi Hasako, Fukuoka (JP)

(73) Assignee: Matsushita Electric Industrial Co., Ltd, Osaka (JP)

( * ) Notice: Subject to any disclaimer, the term of this patent is extended or adjusted under 35 U.S.C. 154(b) by 74 days.

(21) Appl. No.: 10/629,803

(22) Filed: Jul. 30, 2003

(65) Prior Publication Data

US 2004/0024913 A1    Feb. 5, 2004

(30) Foreign Application Priority Data

Jul. 31, 2002    (JP) ............... 2002-222956

(51) Int. Cl.
*H04M 11/04*    (2006.01)
(52) U.S. Cl. ............... 340/310.18; 340/310.11; 340/310.13; 340/310.16
(58) Field of Classification Search ........... 340/310.01, 340/310.02, 310.03, 310.04, 310.06, 310.07, 340/825.26, 825.71, 310.11, 310.12, 310.13, 340/310.16, 310.17, 310.18; 463/40, 42, 463/16
See application file for complete search history.

(56) References Cited

U.S. PATENT DOCUMENTS

| 3,689,886 | A | * | 9/1972 | Durkee | 340/825.26 |
| 5,038,364 | A | * | 8/1991 | Motoori | 375/213 |
| 5,495,406 | A | * | 2/1996 | Kushiro et al. | 700/22 |
| 6,144,292 | A | * | 11/2000 | Brown | 340/310.02 |
| 6,383,076 | B1 | * | 5/2002 | Tiedeken | 463/40 |
| 6,597,282 | B1 | * | 7/2003 | Takata et al. | 340/310.01 |

FOREIGN PATENT DOCUMENTS

| JP | 7-231284 | 8/1995 |
| JP | 2002-124894 | 4/2002 |

OTHER PUBLICATIONS

ECHONET overview of ECHONET CONSORTIUM, Version 2.11.

* cited by examiner

*Primary Examiner*—Van T. Trieu
(74) *Attorney, Agent, or Firm*—McDermott Will & Emery LLP

(57) ABSTRACT

The power line carrier system provides with a filter in a power branch apparatus removable from an external power line. The filter passes a power line carrier signal in a signal mode for the external power line, and interrupts another power line carrier signal which is in a signal mode different from the mode for the external power line.

19 Claims, 15 Drawing Sheets

FIG. 7

| ELECTRIC DEVICE | TRANSMISSION INFORMATION | TRANSMISSION RATE | CARRIER WAVE FREQUENCY | TRANSMISSION POWER |
|---|---|---|---|---|
| TV | VIDEO INFORMATION | 4.7Mbps | 1.7MHz~30MHz | 20mW |
| STEREO UNIT | AUDIO INFORMATION | 320kbps | 1.7MHz~30MHz | 50mW |
| MODEM | ACCOUNTING INFORMATION | 9600bps | 10kHz~450kHz | 100mW |
| POWER UNIT | ELECTRIC POWER COMSUPTION INFORMATION | 9600bps | 10kHz~450kHz | 100mW |

POWER LINE CARRIER SYSTEM

BACKGROUND OF THE INVENTION

1. Field of the Invention

This invention relates to a power line communication that performs the communication by using a power line.

2. Description of the Related Art

ECHONET, Japanese standard of the network using in-house power lines, has been a focus of constant attention. ECHONET is the acronym for Energy Conservation and Homecare Network, contents of which are explained hereunder according to the written standard of ECHONET, Ver.1.01, (published by ECHONET Consortium).

The architecture of ECHONET is shown in FIG. 12.

In ECHONET, electric devices in one range in managing properties, security, and the like, are generally put together into a system. The territory covered by the largest unit in ECHONET is referred to as a "domain". In other words, the domain is defined as the territory of controlled resources (home equipment, appliances and consumer electronics, sensors, controllers, remote controls, etc.) in the range of the network defined in ECHONET.

In ECHONET, an electric device is in communication with another device or a controller for monitoring, controlling, and operating electric devices. And, the electric devices and the controller work in concert with each other. That is called a "system". The range of a system exists in one domain and does not extend over a plurality of domains. One and more systems may be included in the same domain. When a system is connected to another system outside the domain, the system is required to be provided with an ECHONET gateway. Therethrough, the system can be connected with the external of the domain.

ECHONET is allowed to use plural types of transmission media and protocols so as to enable the best use of the characteristics of various transmission media and the construction of optimal systems. The ECHONET network configuration model for the main transmission media is shown in FIG. 13.

As shown in FIG. 13, the connection outside the domain is established through ECHONET gateways (GW). And ECHONET routers, which are intervened between different protocols (i.e., different, transmission media) within the same domain, establish the connection between them.

Respective networks divided by the ECHONET routers are defined as a "subnet". Inserting an ECHONET router to a subnet with the same protocol enables to create a different subnet. The network configuration of a domain can be represented as a collection of subnets. In other words, the domain is a part of the configured network including ECHONET routers, wherein in-house information is exchanged.

In a subnet, a node's identifier (Node ID) is defined and used as an ECHONET communication function identifier unique within at least the subnet (defined as an ECHONET Node). Each subnet has its own unique subnet identifier (Net ID). An ECHONET address is represented as a pair of the subnet identifier and the Node identifier, and this pair is used as the ECHONET Node identifier unique within the domain.

Next, the ordinary power line communication waveform is shown in FIG. 14.

An ordinary power line communication through in-house power lines, like the ECHONET-compliant communication, superimposes a carrier signal waveform 2002 on a commercial power waveform 2001, by which data is transmitted. The frequency of the commercial power wave is 50 Hz or 60 Hz, and the frequency of the carrier signal wave is between 10 kHz and 500 kHz.

Since the above-mentioned power line communication may use an ordinary existing power line, no new cable is required to be wired between in-house electric devices. However, the power line communication has following problems.

First of all, an ordinary in-house power line is not designed for the data communication, and connected to a number of electric devices irrelevant to the power line communication. Additionally, the length of the in-house power line becomes a few 10 meters or a few hundred meters. Those cause the significant deterioration of signals. Due to such significant signal deterioration, the transmission rate of signal becomes 600 bps at most, which is very low.

Secondary, since the electric devices with low impedance are connected to the power line, the signals are absorbed by those electric devices. Therefore, the electric device performing the power line communication needs a big transmission power, e.g., 100 mW.

In addition, when a number of electric devices compliant with the power line communication (called a "power line communication-compliant device) are connected to the power line, all the signals flow into the in-house power line. This causes a problem of a shortage of the communication capability.

Moreover, even if there is the information that the user does not want to leak from a specific device by any means, since all the signals flow into the in-house power line, it is possible for the other in-house devices to obtain the information.

In order to settle the above-mentioned problems, for instance, Japanese Patent Publication No. 7-231284 discloses the following power line carrier system.

Specifically, as shown in FIG. 15, a power strip 2101 receives the power supplied from an external power line 2110, and connects electric devices 2107a, 2107b, and 2107c, those devices to be a communication object. The power strip 2101 is provided therein with a block filter 2105, thereby the signal among the electric devices 2107a, 2107b, and 2107c is blocked entirely, against the external power line. Accordingly, the above-mentioned problems caused from the in-house external power line can be settled regarding the communication among the electric devices 2107a, 2107b, and 2107c.

However, the above conventional power line carrier system has following problems.

First, a communication object in the conventional power line carrier system is limited to an electric device connected to the same power strip. That is to say, if either of electric devices is not connected with the same power strip, the electronic devices do not perform any communication mutually. To enable the communication between the devices that are not connected to the same power strip, it is necessary to wire in a house a new power line corresponding to the high-speed communication, which causes the increase of the user's burden.

Additionally, in the conventional power line carrier system, the signal is sent to all the electric devices connected with the same power strip. That it to say, since the signal is sent to even non-communication-object electric devices, there is a problem of the security of the information as well as there is a possibility that the communication processing delays.

Moreover, it is necessary for the, conventional power line carrier system to prepare a power strip with a block filter other than, the communication object electric device. In other word, this becomes a problem that the facility of the power line communication, such as only to plug into the power outlet, is thrown away.

SUMMARY OF THE INVENTION

The present invention has an object to settle the above various problems involved in the conventional power line carrier system.

In order to achieve the above object, the invention provides a power line carries system for performing the power line communication over power lines. The power line carries system comprises an electric device possible to perform at least the power line communication in a signal mode for an in-house external power line. The in-house external power line signal mode is an ordinary power line carrier signal mode of which communication is also assumed to be performed through power lines wired within a relatively aged house, which is compliant with ECHONET standard, for example. The electric device is provided with a function performing at least the communication in such ordinary power line carrier signal, otherwise may be provided with a function performing the communication in a unique power line carrier signal except such ordinary power line carrier signal. The unique power line carrier signal includes the one based on a new power line compliant with the high-speed communication. The power line carrier system of the invention, without wiring a new power line, adopts a power branch apparatus that branches power supplied from the power line, and supplies the power to a connected electric devices. Such apparatus removable from the external power line is used as the power branch apparatus, so that the power line compliant with the high-speed communication can be ensured at minimum cost on demand. In addition, the apparatus is provided with a signal selector that passes a power line carrier signal of the external power line signal mode, and interrupts a power line carrier signal of which signal mode is different from the external power line signal mode. The signal selector is intervened between a side of receiving power from the external power line and a side of supplying the power, so that the power line communication can be performed in the ordinary power line carrier signal regardless of the power line to which the electric device is connected. Additionally, the communication between the electric devices connected to the power branch apparatus, of which the whole length of the communication route can be shorten, can be performed with lower transmission power than the conventional communication.

Moreover, this power line carrier system may provide the power branch apparatus with a route controller. The route controller transmits the power line carrier signal only to a transmission destination device.

It is designed so as to make a signal mode different per electric device connected to the power branch apparatus, so that it is possible to increase the transmission rate and to reduce the electric power consumption.

BRIEF DESCRIPTION OF THE DRAWINGS

FIG. 7 is a diagram explaining a corresponding table of the fourth embodiment.

DESCRIPTION OF THE PREFERRED EMBODIMENTS

Preferred embodiments of the present invention are described hereinafter.

Embodiment 1

Figure 1:
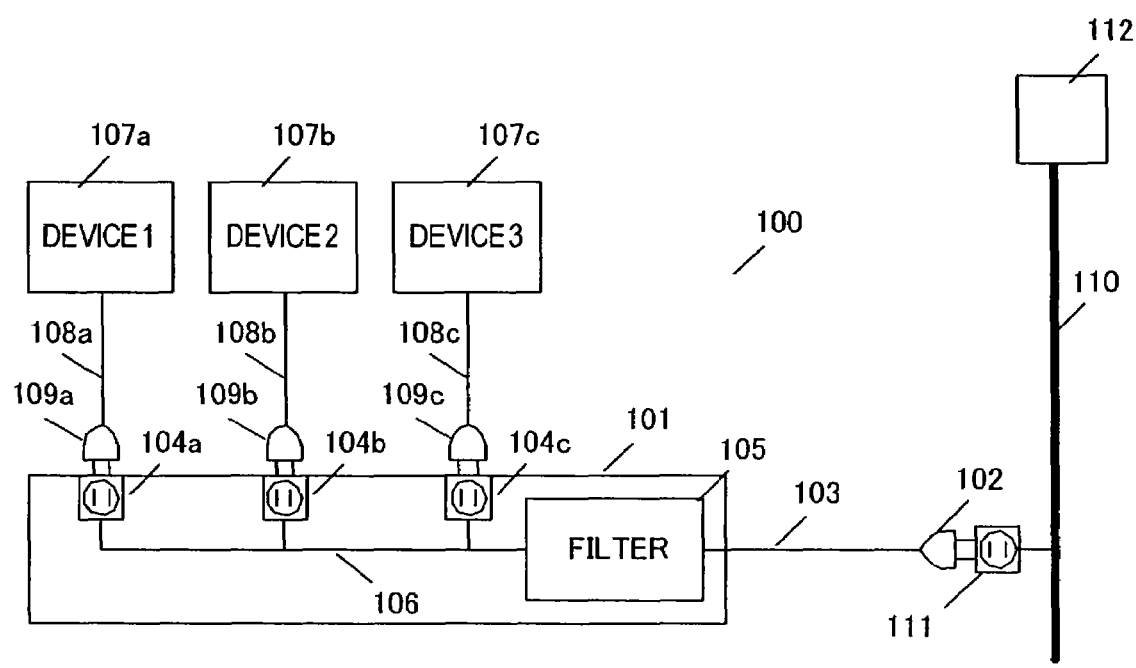
FIG. 1 is a diagram explaining the power line carrier system of the first embodiment.

FIG. 1 is a schematic configuration diagram of a power line carrier system 100 to which the present invention is applied.

The power line carrier system 100 presupposes to apply the ECHONET technology to the power line communication via in-house power line, and the system comprise a power branch apparatus 101, and electric devices 107a, 107b and 107c; said devices will be explained in later. Besides, the technology of ECHONET was explained in fore-mentioned Description of the Related Art, of which details are not explained here.

The power branch apparatus 101 comprises a main power plug 102, a main power line 103, sub power outlets 104a, 104b, and 104c, a filter 105, and a built-in power line 106 of power branch apparatus. The main power plug 102 is connected removably to an external power outlet 111 provided to an external power line 110.

The electric devices 107a, 107b, and 107c comprise power lines 108a, 108b, and 108c, and power plugs 109a, 109b, and 109c. The power plugs 109a, 109b, and 109c are connected removably to the sub power outlets 104a, 104b, and 104c.

The configuration of the power line carrier system 100 is explained in detail hereinafter.

The power branch apparatus 101 branches power supplied from the external power line 110, and supplies the branched power to the electric devices 107a, 107b and 107c via sub power outlets 104a, 104b, and 104c. The external power line 110 is superimposed with an ordinary power line carrier signal, of which carrier wave adopts the frequency bandwidth between 10 kHz and 450 kHz.

A blocking filter 112 is intervened between the in-house external power line 110 and an outdoor power line (not shown in the drawing). The blocking filter 112 interrupts ordinary power line carrier signals on the external power line 110.

Here, since the communication among the electric devices 107*a*, 107*b* and 107*c* is closed within the same power branch apparatus, the number of electric devices connected thereto is small and the distance of the communication is short. Therefore, the present invention is designed that the power carrier signal among the electric devices 107*a*, 107*b*, and 107*c* is separated from the ordinary power carrier signal.

Figure 2:
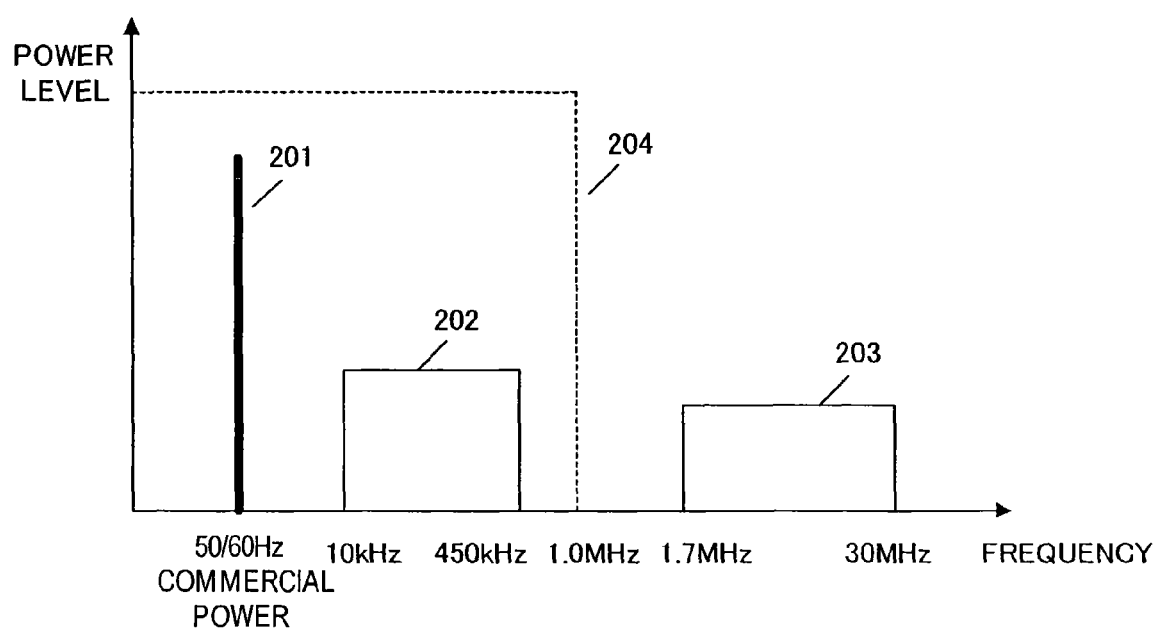
FIG. 2 is a diagram explaining the frequency component of the power line carrier signal of the first embodiment.

That is to say, each electric device 107*a*, 107*b* and 107*c* is provided with not only a function of performing the communication in the ordinary power line carrier signal via external power line, but also a function of performing the communication among the electric devices 107*a*, 107*b* and 107*c* by using the frequency bandwidth 107 MHz to 30 MHz that is different from the carrier wave frequency of the external power line. In this embodiment, the power line signal wave comprises a frequency component 201 of the commercial power 50/60 Hz, a frequency component 202 of the power line carrier signal on the external power line, and a frequency component 203 of the power line carrier signal among the electric-devices 107*a*, 107*b*, and 107*c*, as shown in FIG. 2. To select a signal from those frequency components, the power line carrier system 100 provides the power branch apparatus with a filer 105, in addition to the blocking filter 112.

The filter 105 of the power branch apparatus 101 is designed to interrupt the frequency components over 1.0 MHz like a filter component 204, (that is, a filter passing the frequency components 201 and 202 and interrupting the frequency component 203). Such configuration enables to realize the function to pass the ordinary power,line carrier signal used by the external power line, and not to leak to the external power line the unique power line carrier signal used by the communication among the electric devices 107*a*, 107*b*, and 107*c*.

As described above, it is sure that the invention solves the problem of the conventional communication among the electric devices 2107*a*, 2107*b* and 2107*c* that is caused from the in-house external power line. (the details are given in the "Description of the Related Arts"), and a communication object is not limited to an electric device connected to the same power strip.

As a matter of course, though it is designed in this embodiment that the frequency bandwidth different from the external power line is applied only to the power line carrier signal unique among the electric devices 107*a*, 107*b* and 107*c*. In addition, it is also possible to decrease the transmission power (a power level of signal) of the electric devices 107*a*, 107*b* and 107*c*.

According to the prior arts, because of factors that the signals are absorbed by a number of electric devices with low impedance that are connected to the external power line, and that the signals are rapidly deteriorated due to the external power line length of a several ten meters or a several hundred meters, a big transmission electric power, for example, 100 mW, is required. On the contrary, the invention makes it possible to perform the communication among the electric devices 107*a*, 107*b* and 107*c* by lower transmission power than that of the conventional communication, because the number of electric devices connected to the power branch apparatus is small and the length of the power line is short.

And the power branch apparatus is proved with a, switching means such as a switch or the like, and the function of the power branch apparatus 101 may be changeable according to the switch status. Such configuration makes it possible to change the function of the power branch apparatus. For example, if the user wants to use the power branch apparatus as an ordinary; power strip, the switch may be turned off. Otherwise, if no signals including the ordinary power line carrier signal are allowed to flow to the external power line, the switch may be turned off.

Likewise, the respective electric devices 107*a*, 107*b* and 107*c* are provide with the switching means such as a switch and the like, and the each function of the electric devices 107*a*, 107*b* and 107*c* may be changeable according to the switch status. Such configuration makes it possible to change the function of the electric device. For example, when the switch is off, it is possible to select either of (1) the communication is always performed in the same signal frequency as the ordinary power line communication, (2) the communication is not performed, and (3) the communication is changed to the other one except the power line communication.

Besides, in this embodiment, the shape of the power branch apparatus 101 is not limited in particular, but, if a apparatus is provided with a function to branch the power, such as a power strip, a power strip with an extension code, a built-in outlet, and an distribution board, said apparatus can be adopted as the power branch apparatus 101. As a matter of course, the power branch apparatus may be the one that does not branch the power into plurality (for example, a apparatus with a relay function, such as an extension code), or the one that is combined with an electronic device, such as a power receptacle on the rear panel.

This embodiment indicates a concrete example using the power branch apparatus 101 independently, however, the invention is not limited to this. That is to say, the invention can adopt an example connecting the power branch apparatuses 101 in a form of multistage; for example, the power branch apparatus 101 is further connected to the other power branch apparatus 101.

Moreover, a frequency (1.7 MHz to 30 MHz) higher than the external power line carrier frequency (between 10 kHz and 450 kHz) is used by the communication between the electric devices, but the present invention is not limited to this. That is to say, it is possible to use a carrier frequency lower than this, if the carrier frequency of the communication between the electric devices is not superimposed on the external power line carrier frequency.

Further more, the signal mode of signal superimposed on the power line is not defined in this embodiment. That is to say, if using only a frequency within a specific range, the communication may adopt any signal mode. The signal mode described here is referred to the general methods regarding signals, such as a waveform and frequency of signal, a power level, a modulation type, and a control of transmission destination of signal. The signal mode described here corresponds to a method defined every layer from a physical layer to a transport layer, those layers related in OSI (Open System Interconnection) reference model. This signal mode may be compliant with ECHONET, or may not as well. For example, it is possible to adopt ASK, FSK, PSK, QAM, and OFDM as a modulation method.

In addition, the invention does not define here the direction of the communication and the number of the communication objects. That is to say, the communication of the invention may be a one-way directional communication, a bi-directional communication, a one-many relation communication, or a many-many relation communication.

In the invention of this embodiment, the filter is designed to attenuate the power level of a specific frequency to 0, however, it is not always necessary to attenuate the power level to 0. That is to say, it is designed to attenuate the signal to the least severe level even when the signal flows the external power line, so that it is possible to obtain the same effect as above.

And a means for realizing the filter is not limited in particular. For instance, if a circuit can withstand the in-house AC voltage like a resonant circuit composing passive elements like a condenser, a coil, or the like, and also withstand the power consumption of the connected electric device, such circuit can be adopted as the filter. It is sure that the filter may be configured by a digital circuit and the like, instead of the passive elements such as a condenser, and a coil.

It is decided that the filter should be a low-pass filter interrupting the frequency components over 1.0 MHz, but it is sure that the filter is not limited to the low-pass filter. The interrupted frequency components are not limited to the one over 1.0 MHz, too. If it is possible to interrupt the frequency component used by the communication between the electric devices connected to the power, branch apparatus (or interrupt the frequency component not used by the external power line), any frequency may be used.

It is not referred to a setting method of the frequency component interrupted by the filter, but the setting method is not limited in particular. That is to say, the frequency component interrupted by the filter may be a fixed value every power branch apparatus, or may be determined by the user freely. Otherwise, the filter itself may set dynamically the frequency component as follows.

For example,when detecting the frequency of the signal flowed from the main power side, the filter judges whether the detected frequency accords with the frequency flowed from the sub power side or not. If these do not accord, the signal flowed from the sub power side is interrupted. It is sure that the method dynamically setting the frequency component interrupted by the filter is not limited to this.

Figure 3:
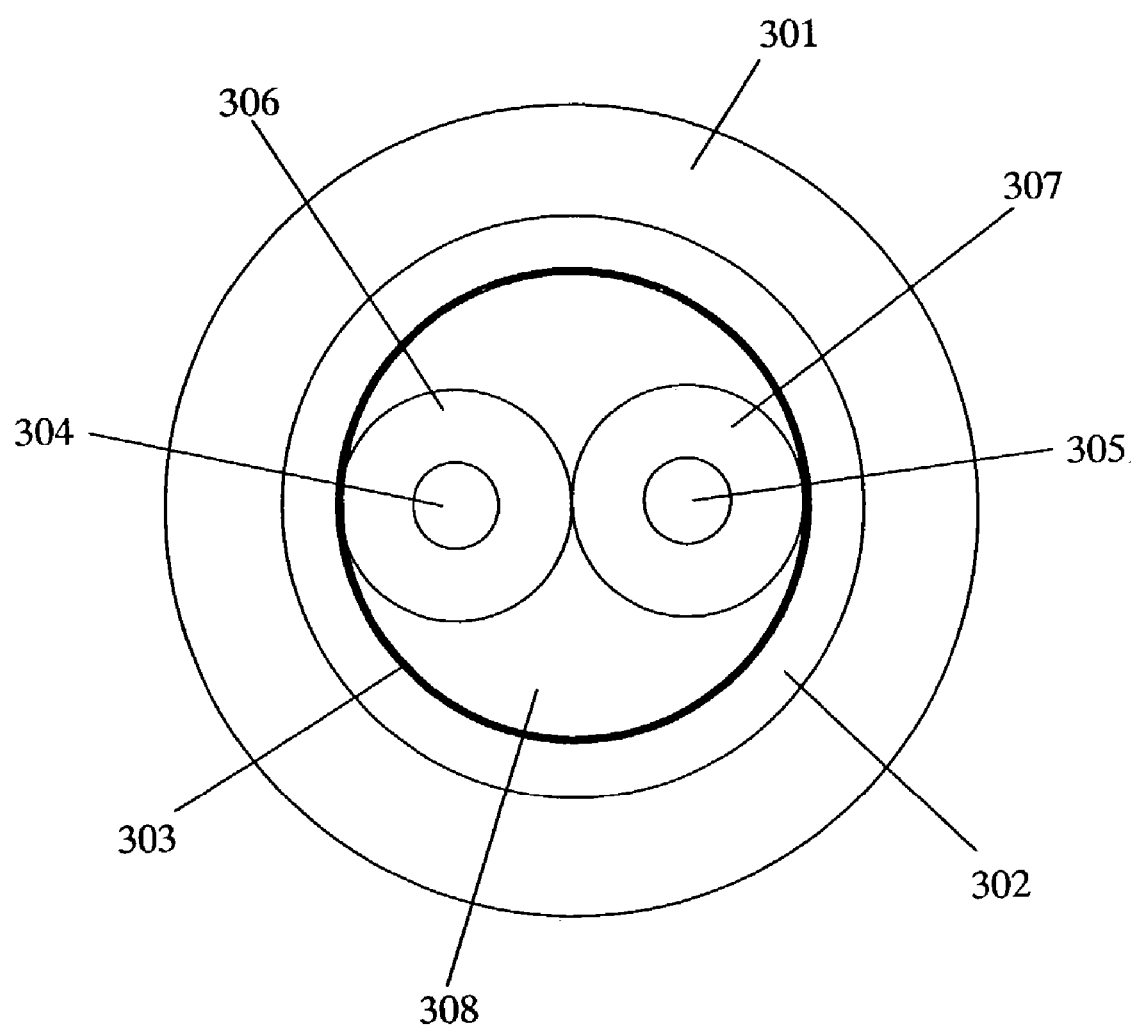
FIG. 3 is a diagram showing a sectional view of an example of the power line.

When the high-speed communication is performed in the unique power line carrier signal, there is a possibility that the influence of the radiant noise from the electric device becomes great, or contrarily the radiant noise from the power branch apparatus 101 exerts an influence on the electric devices, or signals interfere between the power lines. Therefore, it is preferable that the power lines (power codes) of the power branch apparatus 101 and the electronic device connected thereto are subject to a shield. FIG. 3 shows an example of two-cores power line with the shield. In this example, an outermost layer jacket 301 is provided inside with a copper wire braid shield 302 and an aluminum foil shield 303. These shields surround copper core wires 304 and 305, in which the signal flows, interleaving respective insulating bodies 306 and 307 and a filler 308. The aluminum foil shield 302 and the copper wire braid shield 303 can interrupt the noises of the high and low frequency.

Embodiment 2

Here is described this embodiment regarding only different points from the first embodiment.

Figure 4:
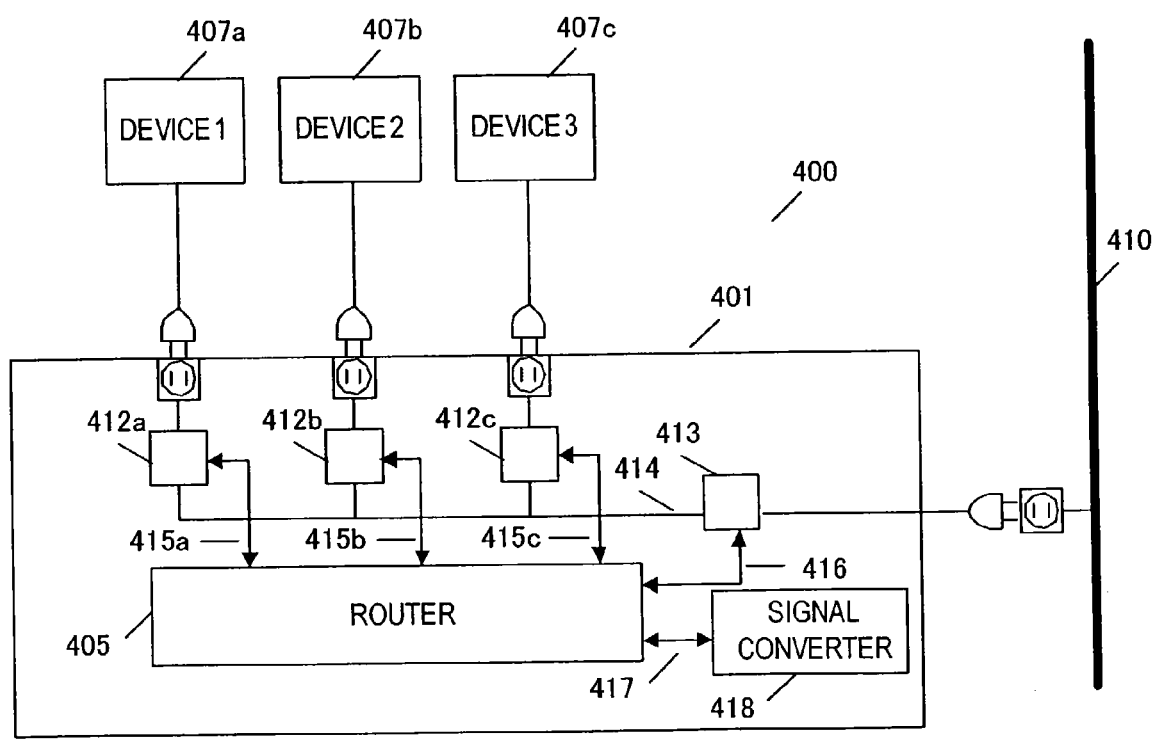
FIG. 4 is a diagram explaining the power line carrier system of the second embodiment.

FIG. 4 is a schematic configuration diagram of a power line carrier system 400 of this embodiment. The power line carrier system 400 comprises a power branch apparatus 401, and electric devices 407a, 407b and 407c.

In addition to the configuration of the power branch apparatus 101 described in the first embodiment, the power branch apparatus 401 comprises sub-power signal separators/couplers 412a, 412b and 412c, a main-power signal separator/coupler 413, an built-in power line 414 of the power branch apparatus, and signal lines 415a, 415b, 415c and 416, a router 405, a signal converter 418, and a signal line 417.

The configuration of the power line carrier system 400 is described here in detail.

The power branch apparatus 401 branches power supplied from the external power line 410 and supplies said power to the electric devices 407a, 407b and 407c via sub-power outlet. The external power line 410 is superimposed with the ordinary power line carrier signal, of which carrier wave adopts the frequency bandwidth between 10 kHz and 450 kHz.

The signal superimposed on the power line of the electric devices 407a, 407b and 407c is taken into a router 405 through the signal separators/couplers 412a, 412b, and 412c and the power lines 415a, 415b and 415c. The signal superimposed on the external power line 410 is also taken into a router 405 through the signal separator/coupler 413 and the signal line 416. That is to say, it is designed that no signal flow into the built-in power line 414 of the power branch apparatus.

A router 405, decodes the signal, and specifies an electric device specified as a transmission destination. If the specified electric device is either of the electric devices 407a, 407b and 407c, the router 405 flows the signal through the power line connected to the specified electronic device and the signal separator/coupler. On the other hand, if the specified electric device is neither of 407a, 407b and 407c, the signal is flowed to the external power line 410 through the signal line 416 and the signal separator/coupler 413.

As described above, it is designed in the present invention that the power line carrier signal between the electronic devices connected to the power branch apparatus is interrupted to flow to the external power line, and allowed to flow to only the required electric device without fail as well Now, the communication among the electric devices 407a, 407b and 407c can be performed by the low transmission power because the communication distance is short and the number of connected electronic devices is small. And it is also possible to increase the transmission rate. On the other hand, the communication using the external power line 410 has a long communication distance and there are a number of electronic devices connected to the external power line, so that the high transmission power is required and the transmission rate cannot be increased.

Therefore, as described hereinafter, the communication among the electric devices 407a, 407b and 407c adopts a signal mode different from the communication using the external power line 401, which becomes effective. The definition of the signal mode is the same as in the first embodiment, but in this embodiment the carrier wave frequency and the power level are called as the signal mode particularly. As a matter of course, since thee invention of this embodiment does not adopt the configuration that the filter 105 interrupts signals (see Embodiment 1), the frequency of signal superimposed on the power line is not limited to a specific range of the frequency.

In case where the communication among the electric device 407a, 407b, and 407c is not compatible at all with the communication using the external power line 410, the signal converter 418 converts the signal mode to the bidirectional mode. However, when the signal mode among the electric devices 407a, 407b and 407 has the upper compatibility with the signal mode of the external power line 410, though the signal on the external power line 401 can flow to the sides of the electric devices 407a, 407b and 407c, it is impossible to perform the reverse processing. Therefore, in this case, the signal mode is changed to a one-way direction (a direction from the external power line 401 to the electric device 407a, 407b and 407c).

For example, when the signal mode among the electric devices 407a, 407b and 407c is different in the carrier wave frequency from that of the external power line 401, the signal converter 418 converts the frequency of the power line carrier signal among the electric devices 407a, 407b and 407c to that of the ordinary power line carrier signal. When the communication among the electric devices 407a, 407b and 407c is different in the required power level from the communication of the external power line 401 (that is to say, the communication among the electric devices 407a, 407b and 407c is performed at the level lower than the communication of the ordinary power line), the signal converter 418 amplifies the power level of the power line carrier signal among the electric devices 407a, 407b and 407c to that of the ordinary power line carrier signal.

As described above, the invention can separate the signal mode of the electric device connected to the power branch apparatus from the signal mode of the external power line, in result the invention can makes it possible to increase the transmission rate and to decrease the power consumption.

Besides, this embodiment shows an example of the power branch apparatus provided with both the router and the signal converter, but the invention is not limited to this. That is to say, the power branch apparatus may be provided with the router only, or the signal converter only. It is nevertheless to say that this signal converter and the filter described in the first embodiment may be provided to the same power branch apparatus.

Figure 5:
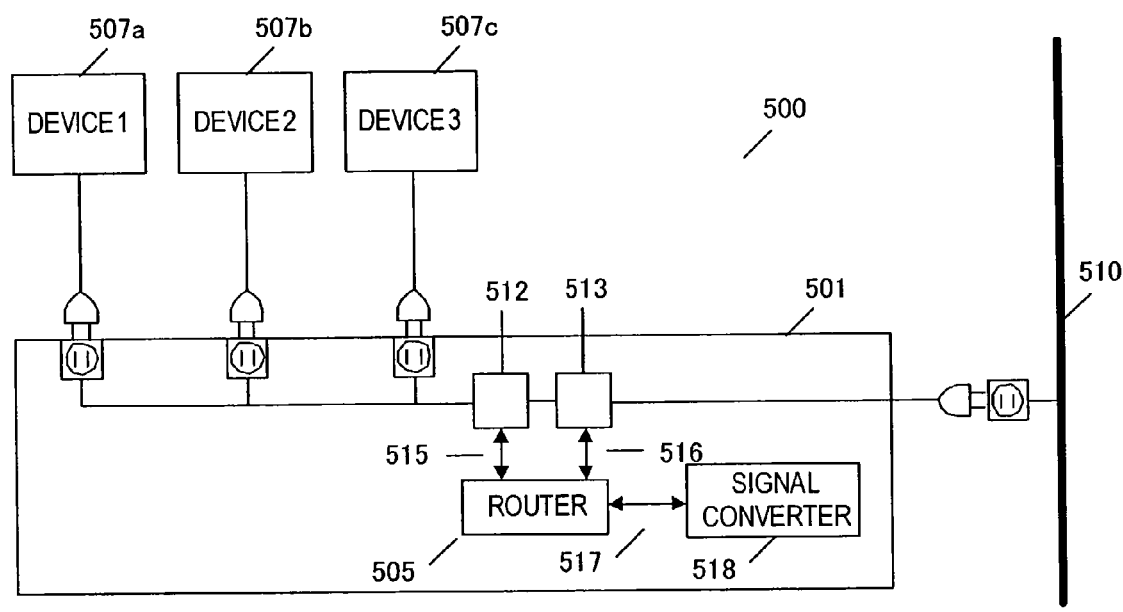
FIG. 5 is a diagram explaining the power line carrier system of the second embodiment.

FIG. 4 shows an example of the power branch apparatus in which respective sub-power signals are controlled independently by the signal separators/couplers 412a, 412b and 412c. However, the present invention is not limited to this. That is to say, as shown in FIG. 5, the sub-power signal may be controlled by one signal separator/converter 512. In such case, it is possible to obtain the same effect in respect of that the power line carrier signal among the electric devices connected to the same power branch apparatus does not flow to the external power line.

FIG. 4 and FIG. 5 show an example of the power branch apparatus provided with the router controlling a signal communication route. But, a configuration with such router makes the configuration of the power branch apparatus complex, which is also a trouble. To solve this problem, the power branch apparatus may be provided with a switch controlling the signal communication route instead of the router (this switch and the router are collectively called as a "route controller").

For instance, when the electric devices 407a performs the communication only with the electric device 407c but performs no communication with the electric device 407b and the external power line, the switches corresponding to the electric devices 407a and 407c are turned on, while the other switches corresponding to the electric device 407b and the external power line are turned off. According to such configuration, the signal communication route can be controlled in the same way as the configuration provided with the power branch apparatus. As a matter of course, it may adopt a configuration that the electric device itself is provided with a switch instead of the power branch apparatus.

Embodiment 3

Here is described this embodiment only regarding different points from the first or second embodiment.

Figure 6:
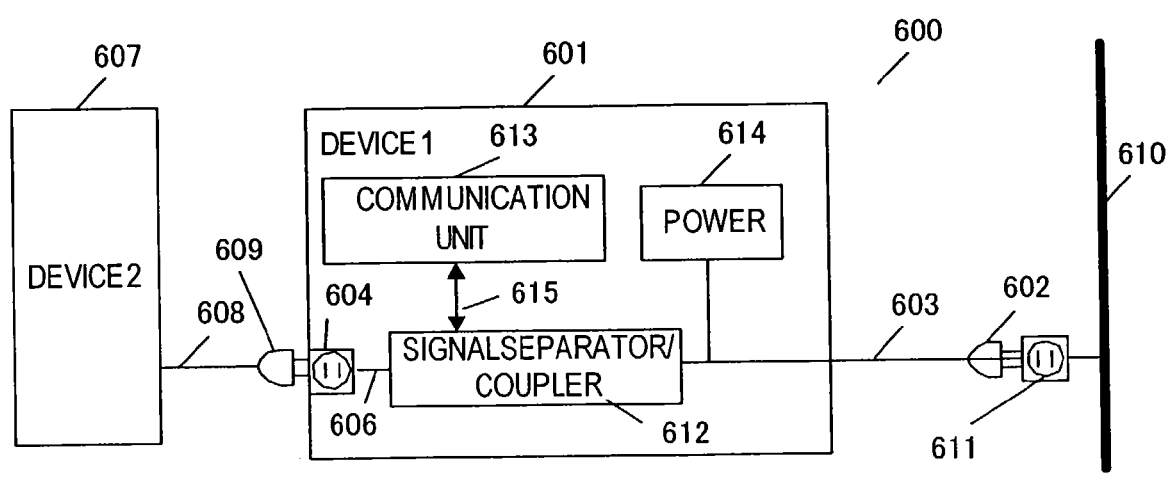
FIG. 6 is a diagram explaining the power line carrier system of the third embodiment.

FIG. 6 is a schematic configuration diagram of a power line carrier system 600 of this embodiment. The power line carrier system 600 comprises electric devices 601 and 607.

The electric device 601 comprises a main-power plug 602, a main-power line 603, a sub-power outlet 604, a sub-power line 606, a signal separator/coupler 612, a communication unit 613, a power 614, and a signal line 615. The main-power plug 602 is connected removably to the external power outlet 611 provided to an external power line 610.

The electric device 607 comprises a power line 608 and a power plug 609. The power plug 609 is connected removably to the sub-power outlet 604.

The configuration of the power line carrier system 600 is explained hereinafter in detail.

The electric device 601 not only takes the power supplied from the external power line 610 into the power 614, but also supplies said power to the electric device 607 through the sub-power outlet 604.

The signal separator/coupler 612 of the electric device 601 separates from the ordinary power line carrier signal the signal that the electric device 607 outputs through the power line 608, and sends the separated signal to the communication unit 613 through the signal line 615. At this time, since no signal from the electric device does not flow to the power line 603, the communication between the electric devices can be performed regardless the external power line.

As described above, the invention does not require the power strip with the block filter, and the like. Therefore, it is possible to solve the problem that the power line communication loses the facility of plugging into the power outlet.

Besides, this embodiment shows an example, of the communication from the electric device 607 to the electric device 601, but the present invention is not limited to this. That is to say, the, communication from the electric device 601 to the electric device 607 can be carried out, too, in the same way.

In this embodiment, the shape of the sub-power outlet 604 is not limited in particular. That is to say, if built in the electric device and provided with a function of branching or relaying the power, the apparatus can be used as the sub-power outlet 604. It is sure that the power receptacle is also an example of the sub-power outlet 604.

Though this embodiment shows an example that the number of the sub-power outlet provided to the electric device 601 is 1, the invention is not limited to this. That is to say, the electric device 601 may be provided with a plurality of the sub-power outlets.

Under this configuration, the signal is designed not to flow to the external power line 610, however, like the first and second embodiments, it is possible to perform the communication on the sub power side while keeping the communication to the external power line 610. That is to say, the invention may adopt a configuration that the power branch apparatus of the first and second embodiment is built in the electric device 601. Under such configuration, for example, the ordinary power line communication performs between the electric device and an electric device connected direct to the external power line, and at the same time it is possible to realize the high-speed transmission rate between the electric devices 601 and 601 by means of the carrier frequency that the ordinary power line communication does not use.

As a matter of course, the invention may control the signal by operating the switch that is provide to the electric device like the first and second embodiment such configuration makes it possible to control signals, for example, only when the switch of the electric device 601 is turned ON, the signal is allowed to flow the signal to the main-power side.

Embodiment 4

Here is described this embodiment regarding only different points from either one of the first to third embodiments.

In this embodiment, it presupposes a status that an in-house power line is connected with power line communication-compliant devices, such as a Set Top Box (STB), TV, a stereo unit, a modem, and a power meter.

Here is explained information that STB transmits to each kind of electric device.

For example, STB decodes broadcast waves of broadcasting satellite (BS), and transmits the video signals to TV and the audio signals to the stereo unit. And if the user watches the pay-broadcast, the accounting information for the vendor is transmitted to the modem. Additionally, STB transmits the information of the power consumption of the in-house electric device (the power consumption information) to the in-house power meter.

Those information transmitted from STB differ respectively in the information volume and the required transmission rate. If it is possible to ensure the transmission rate enough to transmit such information through the power line, there is no problem. However, such status does not exist in fact. If the transmission rate is changed, it is necessary to change the available carrier frequency and the transmission power level. And the parameter of the transmission signal must be set properly.

Therefore, the invention is designed as shown in FIG. 7 that STB is provided with a corresponding table describing the transmission rate corresponding to a transmission destination electric device or the transmission information, and the carrier wave frequency and the power level corresponding to the described transmission rate. In result, referring to the corresponding table enables to transmit proper signals to the respective electric devices from STB.

Besides, STB, TV and the like are exemplified as an electric device, but the invention can be applied to any kind of electric device if the device can communicate with the other electric device through the power line.

As the parameter of the transmission signal, the transmission rate and the carrier wave frequency and the power level relevant to the transmission rate are exemplified in this embodiment. However, the parameter of the transmission signal may be information regarding the transmission signal's condition. For example, a communication standard can be adopted as the parameter of the signal. In this case, a plurality of communication standards described in the same corresponding table may not have any compatibility mutually.

Moreover, in this embodiment, only one kind of parameter is prepared every kind of electric devices, but a unit for which the parameter is prepared is not limited in particular. That is to say, plural kinds of parameters may be prepared every kind of electric devices. Otherwise, even for the same electric device, different parameters may be prepared on the basis of the conditions such as a setup place.

Furthermore, the invention of this embodiment is designed that the corresponding table is configured within the electric device in advance. However, the creating method and control method of the corresponding table are not limited in particular. That is to say, it is configure so as to makes it possible to change the contents of the corresponding table as occasion demands, or, to create the corresponding table dynamically.

In addition, if the electric device performs the communication by the ordinary power line carrier signal, the communication can be established regardless of whether the electric device is connected to the power branch apparatus. Accordingly, for example, a server connected to the external power line may control a table associating an electric device with a communication method used by the electric device. In such case, the electric device of the transmission origin inquires of the server as to the electric device that is specified as the transmission destination, and the server sends back the corresponding communication method in response to the inquiry. The electric device of the transmission origin can determine the communication method to be used in the communication according to the response.

Embodiment 5

In the fourth embodiment, referring to the corresponding table enables STB to transmit the proper signal to respective electric devices. However, in the fourth embodiment, it is impossible to transmit the proper signal to the electric devices not described in the corresponding table. And as the number of electric devices increases, the corresponding table becomes large. In result, such corresponding table requires a large volume of the memory area, this is a problem, too. Additionally, in case of adopting the configuration that the contents of the corresponding table is changed dynamically, the table management method becomes a problem.

Here is described this embodiment regarding only different points from the fourth embodiment.

Figure 8:
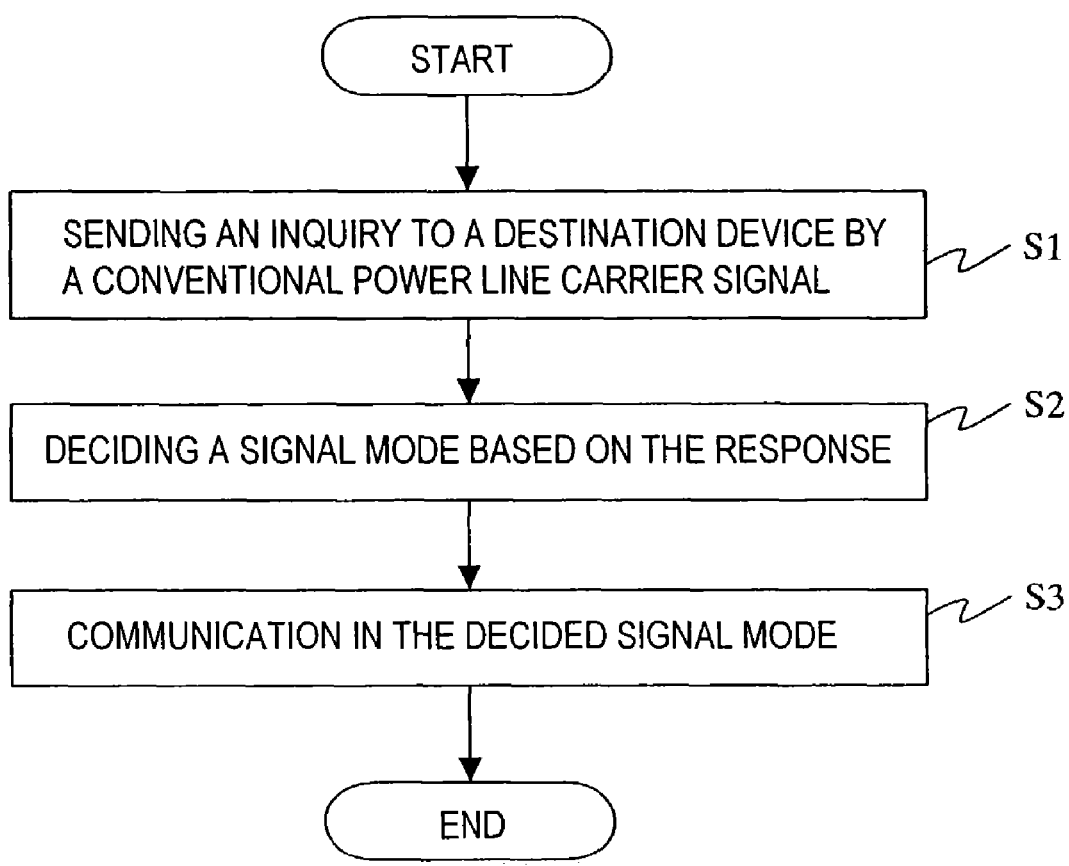
FIG. 8 shows a flow chart explaining the power line communication method.

When the video signal is transmitted from STB to TV, STB inquires of TV as to the maximum transmission rate by the ordinary power line carrier signal as shown in FIG. 8.(S1). Each device such as TV and STB records the signal mode to be used by own, such as data of the transmission rate, in this case. And in response to the enquiry, the data value is sent back. According to the response to the enquiry, STB determines the transmission rate for the TV communication (S2). And when it is found that the TV maximum transmission, rate is more than the STB maximum transmission rate (4.7 Mbps, for example), the 4.7 Mbps video signal is transmitted from STB to TV (S3).

And when it is found that the TV maximum transmission rate is 2.7 Mbps, for example, the video signal cannot be transmitted from STB to TV at such transmission rate. Therefore, in such case, the transmission of the video signal is cancelled or the video signal is down-converted to 27 Mbps and then transmitted.

When, STB transmits information without real-time characteristics, such as the power consumption information to be transmitted to the power meter, the above-mentioned down-converter is not required. In such case, the information may be transmitted at the maximum transmission rate determined based on the inquiry.

As described above, the invention adopts a method that a negotiation is performed between communicating electric devices and the proper transmission rate is determined based on the result, so that the signal can be transmitted under the proper communication conditions without managing the corresponding table.

Besides, this embodiment describes a case where the transmission rate is determined based on the negotiation between the communicating electric devices, however, the invention is not limited to this. That is to say, if the information is the one referring to the communication signal condition such as the carrier wave frequency, the power level, and the communication standard, the transmission rate can be determined based on the negotiation between the communicating electric devices in the same way as above.

In addition, it is possible to obtain the response regardless of whether the device is connected to the power branch apparatus of the invention, when the inquiry is performed by the ordinary power line carrier signal.

Embodiment 6

In the fifth embodiment, the invention adopts a method that a negotiation is performed between communicating electric devices and the proper transmission rate is determined based on the result, so that the signal can be transmitted under the proper communication conditions without managing the corresponding table. However, such signal mode in the fifth embodiment is determined based on the electric devices information only, accordingly, if the determined transmission rate is over the maximum rate of the communication route, it is impossible to perform a proper communication.

Here is described this embodiment regarding only different points from the fifth embodiment.

Figure 9:
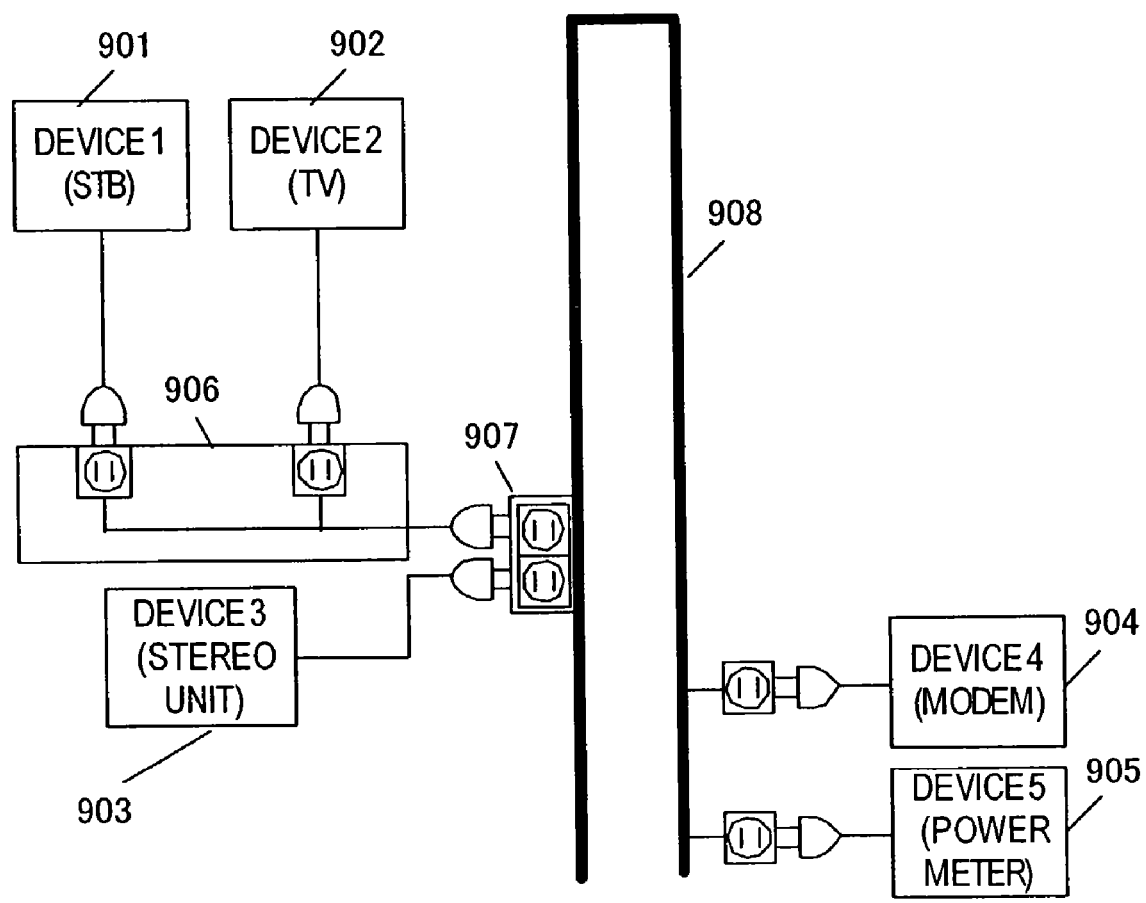
FIG. 9 is a diagram, explaining an example of connecting the power line of the electric device of the fourth embodiment.

FIG. 9 shows a status that a plurality of electric devices is connected to the in-house power line. In this case, an electric device 901 is STB, an electric device 902 is TV, an electric device 903 is a stereo unit, an electric device 904 is a modem, and an electric device 905 is a power meter.

The electric devices 901 and 902 are connected to a power branch apparatus 906, and the electric device 903 and the power branch apparatus 906 are connected to a power branch apparatus 907. The, power branch apparatus 907 and other electric devices 903–905 are connected direct to a power line 908.

As described in the first to fifth embodiments, the transmission rate of the signal passing through the external power line cannot be converted to high-speed. But the signal interrupted by the power branch apparatus can be converted to high-speed.

When the routes from STB 901 shown in FIG. 9 are paid attention, as for the route to TV 902 or the stereo unit 903 on which a signal does not go through the external power line 908, it is preferable to, transmit the signal at a high transmission, speed. And, as for the route to the modem 904 or the power meter 905 on which a signal goes through the external power line 908, if the signal can be transmitted even at a low transmission speed, that is enough.

Figure 10:
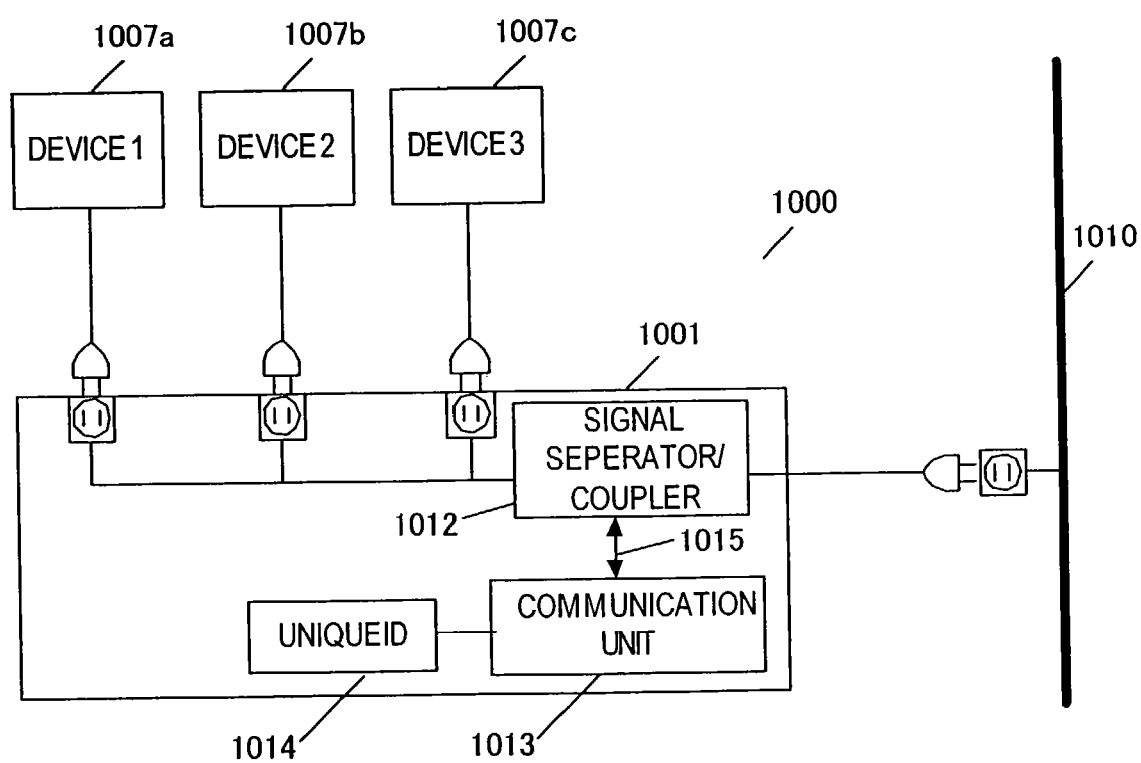
FIG. 10 is a diagram explaining the power line carrier system of the sixth embodiment.

If the communication route can be recognized in such way, the, signal can be transmitted at proper transmission rate. The follows explain about an example of methods for recognizing the communication route between communicating electric devices, according to FIG. 10.

A power line carrier system 1000 comprises a power branch apparatus 1001, and electric devices 1007a, 1007b and 1007c. The power branch apparatus 1001 comprises a signal separator/coupler 1012, a communication unit 1013, an identifier (unique ID) unique to the power branch apparatus 1014, and a signal line 1015, in addition to the configuration for branching the power.

The branch power apparatus 1001 receives an inquiry as to a unique ID from the electric devices 1007a, 1007b and 1007c, and in response to the inquiry sends back the unique ID 1014 through the signal separator/coupler 1012, the signal line 1015, and the communication unit 1013. Consequently, it defines that the electric devices, which have obtained the same unique ID, are connected to the same power branch apparatus.

When it found a good communication status that STB and TV are connected each other through the same power branch apparatus, STB flows high-quality video signal to TV. On the other hand, when it found a bad communication status that that STB and TV are connected each other through the external power line, STB flows the down-converted video signal to TV.

As above, the present invention is designed so as to embed a unique ID in the power branch apparatus, so that it is possible to perform the communication based on the communication route between the electric devices.

Besides, this embodiment shows a configuration that enables to recognize the connection between the electric devices by providing the power branch apparatus with a unique ID, but this configuration is only an example to recognize the connection between the electric devices, and the invention may adopt the other configurations.

For instance, the unique ID may be set to the power line itself instead of the power branch apparatus. Otherwise, the ID to be set in such way may be the one other than a concept of a unique ID. That is to say, in stead of a unique ID, a unique group ID is imparted to each specific group (a group of electric devices including a common transmission route). According to the unique group ID, even though it is not possible to specify, respective communication route, it is possible to specify whether the communication route is assigned to the same group or not.

Additionally, where the unique ID is obtained by the ordinary power line carrier signal, the other unique ID can be also obtained from the device connected direct to the external power line. Therefore, a server connected to the external power line may manage a table associating an electric devices ID and a unique ID of a power branch apparatus connected with the electric device. In such case, the electric device of the transmission origin inquires of the server as to the electric device specified as the transmission destination, and the server sends back the corresponding unique ID in response to the inquiry. According to such response, the electric device of the transmission origin can decide whether the electric device of the transmission destination is connected to the same power branch apparatus.

Embodiment 7

As described above, in the sixth embodiment, it is designed to embed a unique ID into a power branch apparatus, so that it is possible to perform the communication corresponding to the communication route between the electric devices. However, in the sixth embodiment, the transmission rate is determined based on the information whether both electric devices are connected to the same power branch apparatus, in result there is a occasion when it is not possible to perform the proper communication.

That is to say, even if both electric devices are connected to the same power branch apparatus, the maximum transmission rate changes according to factors, such as the number of branches, the length of the power line, the noise resistance, and also a condition whether a low-impedance electric device is connected to the power branch apparatus or not. And, even when the communication route passes through the external power line, the maximum transmission rate changes according to whether the communication distance is short or long. Moreover, there is also a problem that the configuration of the power branch apparatus becomes complicated in case of adopting the method of setting a unique ID to the power branch apparatus.

Here is described the embodiment of this invention regarding only different points from the sixth embodiment.

When video signal is transmitted from STB to TV, if the transmission rate of this video signal is 4.7 Mbps, for example, STB transmits a 4.7 Mbps test signal to TV. On receiving such test signal, TV measured an error rate of that signal and the power level. When the measured power level is attenuated under a specific value, the signal transmission is cancelled under such communication condition. And TV asks STB to re-send a test signal of which power level increases.

In addition, even when the measured power level is not attenuated, if the error rate is over a specific value, the signal transmission is cancelled under such communication condition. And TV asks STB to re-send the test signal of which transmission rate decreased.

While being changed based the test signal between the sending device and the receiving device as mentioned above, the communication condition is adjusted so as to meet the error rate and the power level to the standard conditions. Consequently, after down-converting the video signals so as to correspond to the adjusted communication conditions, STB can transmit the down-converted video signal.

As described above, the invention is designed that the communication conditions are determined by transmitting the test signal in advance, so that the actual communication conditions can be determined properly.

Besides, in this embodiment, only the error rate and the power level are mentioned as a matter of measuring the test signal, but the other parameter may be measured except them.

In addition, this embodiment mentions an example that only the power level of the transmission signal is changed based on the measurement result of the test signal, but the invention is not limited to this. That is to say, it may change the other information regarding the transmission signal, like the carrier frequency and the communication standard, instead of the power level.

Embodiment 8

In order to avoid the power level attenuation in the communication between the electric devices connected to the power branch apparatus, a new contrivance may be provided to the power branch apparatus itself. Here is explained this embodiment regarding only different points from the seventh embodiment.

Figure 11:
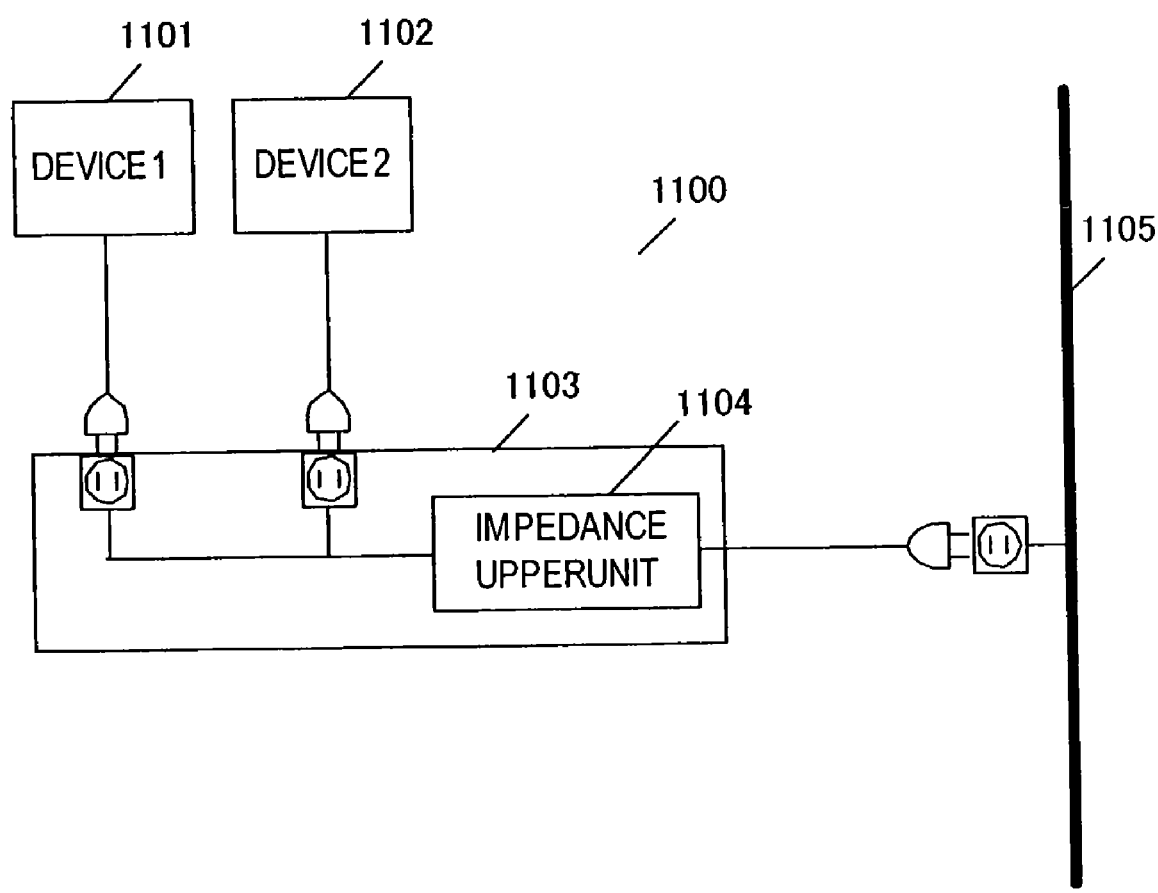
FIG. 11 is a diagram explaining the power line carrier system of the eighth embodiment.
Figure 12:
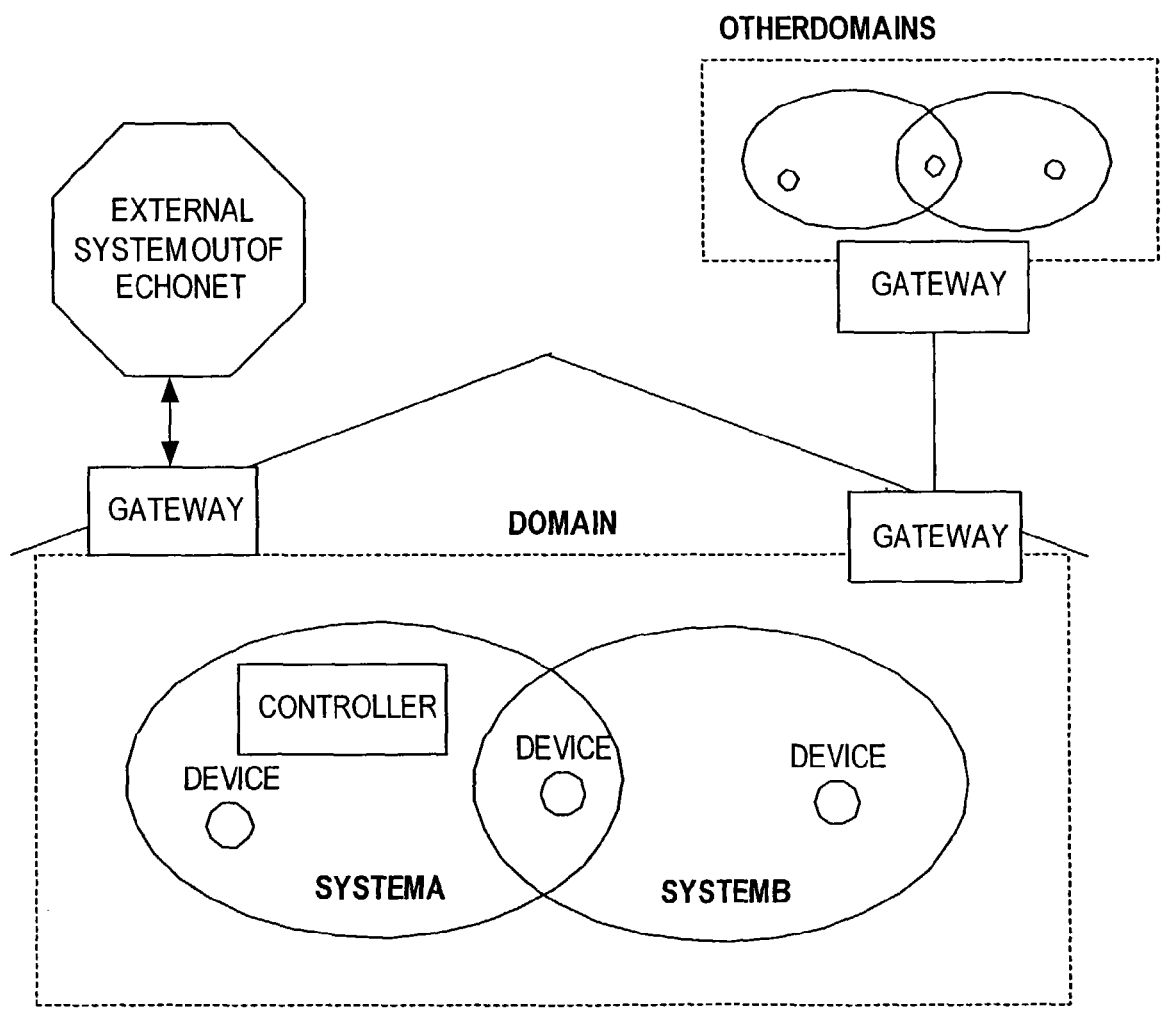
FIG. 12 is a diagram showing the system architecture of ECHONET.
Figure 13:
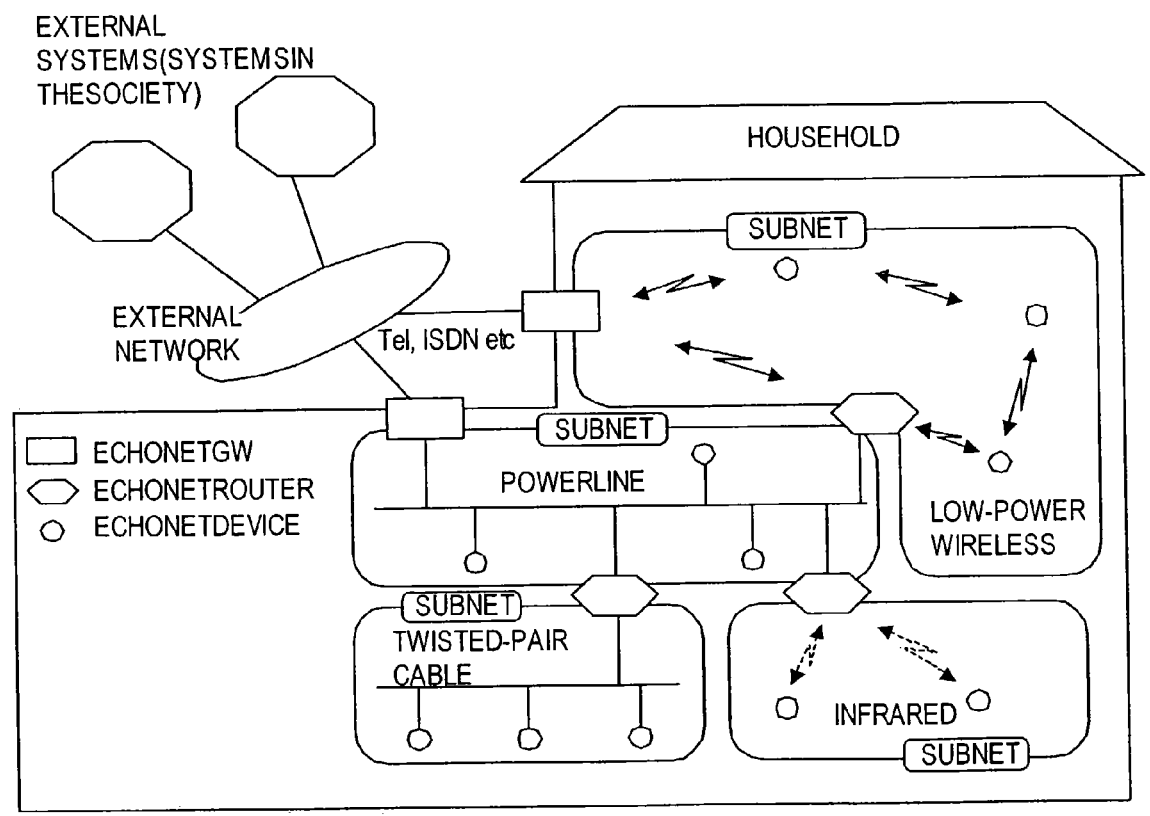
FIG. 13 is a diagram showing the network structure of ECHONET.
Figure 14:
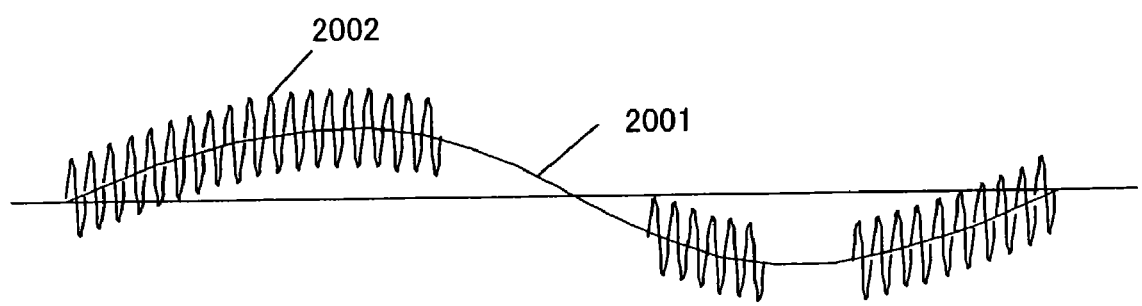
FIG. 14 is a diagram explaining the ordinary power line carrier signal waveform.
Figure 15:
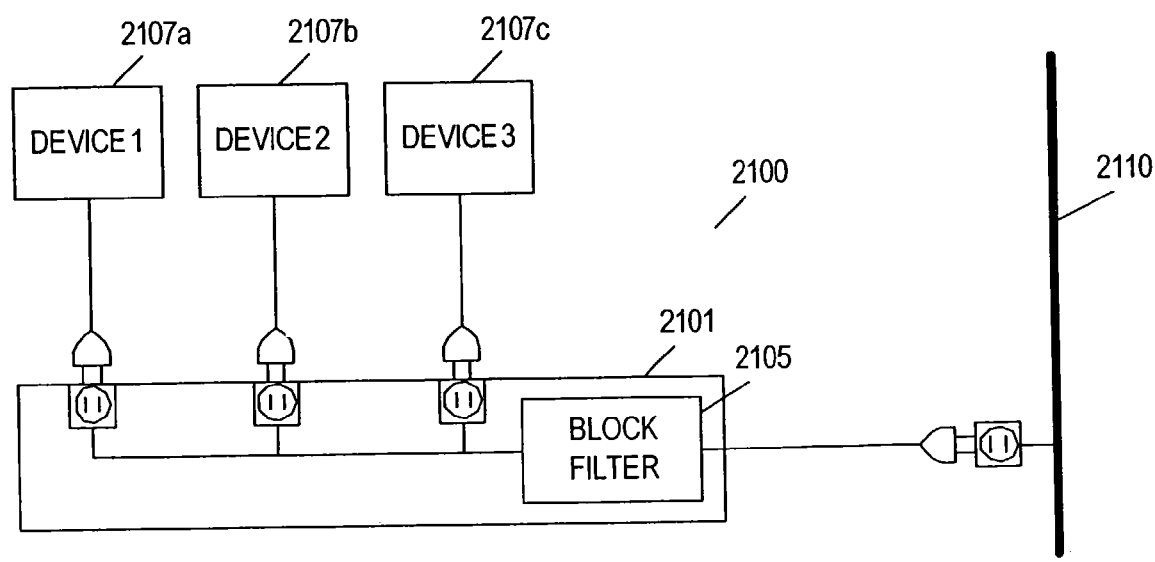
FIG. 15 is a diagram explaining the conventional power line carrier system.

As shown in FIG. 11, a power branch apparatus 1103 is configured by inserting an impedance upper unit 1104 between an external line 1105 and an electric device 1101, and between an external power line 1105 and an electric device 1102. The impedance upper unit 1104 has a function that makes it high the impedance when a side of the external power line 1105 is seen from the electric devices 1101 and 1102.

For instance, when the signal is transmitted from the electric device 1101 to the electric device 1102, the signal transmitted from the electric device arrives at the electric device 1102 in the state that the impedance upper unit 1104 does not leak the signal to the external power line 1105. Accordingly, it is possible to judges by referring to the attenuation degree of the test signals power level whether the electric devices 1101 and 1102 are connected direct through the power branch apparatus 1103. And according to the judgment result, the communication conditions can be changed.

Besides, the method of realizing the impedance upper unit is not defined in particular. That is to say, it is possible to adopt any method that makes it high the impedance when a side of the external power line 1105 is seen from the electric devices, 1101 and 1102, like a resonant circuit comprising a condenser, a coil, and a receiving element.

It is sure in this embodiment that there is a problem that the configuration of the electric device becomes complicated because the electric device decides the transmission rate automatically. In order to settle such problem, a switch may be provided to the electric device that can change the transmission rate according to the switch condition.

For example, when the electric device 1101 performs the communication with the electric device 1102, if both devices are connected to the same power branch apparatus, respective switches provided to the devices are set to a high-speed mode, and the communication is performed at the high-speed transmission rate. On the other hand, the both devices are connected through the external power line, respective switches provided to the devices are set to a low-speed mode, and the communication is performed at the low-speed transmission rate. Therefore, the transmission rate can be changed with ease from outside by providing electric devices with such switches.

In the above-mentioned respective embodiments, the ECHONET-compliant method is adopted as the signal mode for the low-speed transmission, and the high-speed communication between the electric devices is performed according to a unique method using the frequency bandwidth between 1.7 MHz and 30 MHz. However, the signal mode used by the system of the invention is not limited to this. It is possible to adopt as the signal mode various methods in the world, a method compliant with LonWorks standard, a method compliant with HomePlug standard, and a method compliant with HomePlug AV standard now under formulating. LonWorks can use FSK as the modulation method, of which bandwidth is defined between 125 kHz and 140 kHz. The signal transmission rate is 5400 bps at the maximum. And HomePlug uses OFDM as the modulation method, of which bandwidth is defined between 4 MHz and 21 MHz. The maximum transmission rate is 14 Mbps, which is pretty high-speed than ECHONET and LonWorks. HomePlug AV is compliant to the distribution of the dynamic image data such as HDTV, so that the transmission rate can be expected to be higher than the other.

For instance, even if the in-house wired external power line cannot correspond to the high-speed signal of HomePlug and has to be resigned to adopting only a lower-speed signal such as LonWorks, the power line carrier system of the present invention does not require to re-wire the external power line because the communication is performed between devices compliant with HomePlug. By connecting those devices to a power branch apparatus compliant with HomePlug, the high-speed communication can be performed between the devices connected to the power branch apparatus. Even between an existing device connected to the external power line and a device compliant with HomePlug the communication can be performed at low-speed, if both devices corresponds to the same signal mode. Additionally, the existing external power line, even if now corresponding to the high-speed signal such as HomePlug, will not correspond to the higher-speed signal such as HomePlug-AV now under formulating in near future. Such possibility cannot be removed. Even in such case, the power branch system of the invention can carry out the communication between devices at high speed only by connecting the power branch apparatus compliant with new reformulated standard and such standard-compliant device. Since the device compliant with. HomePlug-AV is also compliant with. HomePlug, if a device compliant with HomePlug-AV connected to the power branch apparatus is going to communicate with a device compliant with HomePlug not connected to the same power branch, the communication between such devices can be performed by the HomePlug signal.

What is claimed is:

1. A power line carrier system comprising:
a power branch device including
a power plug being removably connected to an in-house external power line,
a plurality of power outlets, and
a built-in power line for connecting the power plug and the power outlets; and
at least one electric device configured to be plugged into one of the power outlets, and perform a power line communication in a first signal mode and a second signal mode, with another electric device, the first signal mode being for a power line communication between electric devices connected to the built-in power line, and the second signal mode being for a power line communication between an electric device connected to the built-in power line and an electric device not connected to the built-in power line via the in-house external power line,
wherein the power branch device controls the power line communication to pass a power line carrier signal in the first signal mode only in the built-in power line, and allow a power line carrier signal in the second signal mode to pass in the in-house external power line.

2. A power line carrier system according to claim 1, wherein the power branch device supplies power obtained via the power plug from the in-house external power line to the at least one electric device plugged into the one of the power outlets.

3. A power line carrier system according to claim 1, wherein the power branch device further includes a filter configured to reject a frequency component corresponding to the power line carrier signal in the first signal mode from a signal from the built-in power line to the in-house external power line.

4. A power line carrier system according to claim 1, wherein the power branch device further includes a route controller configured to transmit the power line carrier signal only to an electric device of destination of the signal.

5. A power line carrier system according to claim 1, wherein the power branch device includes a signal converter configured to convert a signal mode of a power line carrier signal to the second signal mode.

6. A power line carrier system according to claim 5, wherein the signal converter converts a frequency of the power line carrier signal in the first signal mode to a frequency of the power line signal in the second signal mode.

7. A power line carrier system according to claim 5, wherein the signal converter converts a power level of the power line carrier signal in the first signal mode to a power level of the power line signal in the second signal mode.

8. A power line carrier system according to claim 1, wherein the first signal mode is compliant with the ECHO-NET standard.

9. A power line carrier system according to claim 1, further comprising a blocking filter configured to reject the power line carrier signal in the second signal mode, said blocking filter being placed between the inside and outside of a house.

10. A power line carrier system according to claim 1, wherein the electric device has a power code with a shield.

11. An electric device of a power line carrier system according to claim 1, wherein the at least one electric device selects the first signal mode or the second signal mode according to the another electric device of destination of the power line carrier signal, said another electric device being plugged into one of the other power outlets of the power branch device.

12. An electric device according to claim 11, wherein the at least one electric device sends an inquiry to said another electric device in the second signal mode, and selects the first signal mode or the second signal mode according to the inquiry result.

13. An electric device according to claim 11, wherein the at least one electric device selects the first signal mode or the second signal mode according to a communication route toward said another electric device.

14. An electric device according to claim 11, wherein the at least one electric device selects the first signal mode or the second signal mode according to whether to be connected to the same power branch device as said another electric device.

15. An electric device according to claim 11, wherein the at least one electric device transmits a test signal to said another electric device, and selects the first signal mode or the second signal mode according to communication conditions obtained by transmitting the test signal.

16. An electric device according to claim 15, wherein the at least one electric device selects the first signal mode or the second signal mode according to an error rate of the test signal.

17. An electric device according to claim 15, wherein the at least one electric device selects the first signal mode or the second signal mode according to an attenuation rate of the test signal.

18. A power branch apparatus comprising:
a power plug being removably connected to an in-house external power line;
a plurality of power outlets; and
a built-in power line for connecting the power plug and the power outlets, each of the power outlets configured to be connected to an electric device configured to perform a power line communication in a first signal mode and a second signal mode, with another electric device, the first signal mode being for a power line communication between electric devices connected to the built-in power line, and the second signal mode being for a power line communication between an electric device connected to the built-in power line and an electric device not connected to the built-in power line via the in-house external power line,
wherein the power branch device controls the power line communication to pass a power line carrier signal in the first signal mode only in the built-in power line, and allow a power line carrier signal in the second signal mode to pass in the in-house external power line.

19. A method for performing a power line communication in a power branch device including a power plug being removably connected to an in-house external power line, a plurality of power outlets, and a built-in power line for connecting the power plug and the power outlets, wherein each of the power outlets is configured to be connected to an electric device configured to perform the power line communication in a first signal mode and a second signal mode, with another electric device, the first signal mode being for a power line communication between electric devices connected to the built-in power line, the second signal mode being for a power line communication between an electric device connected to the built-in power line and an electric device not connected to the built-in power line via the in-house external power line, and the power branch device controls the power line communication to pass a power line carrier signal in the first signal mode only in the built-in power line, and allow a power line carrier signal in the second signal mode to pass in the in-house external power line, said method comprising the steps of:

deciding to adopt either one of the first signal mode and the second signal mode according to an electric device of destination; and performing the power line communication with the electric device of destination in the decided mode.

* * * * *